United States Patent
Reial et al.

(10) Patent No.: US 11,224,010 B2
(45) Date of Patent: Jan. 11, 2022

(54) METHOD AND APPARATUS FOR INDICATING AND USING RADIO ACCESS TECHNOLOGY PREFERENCES IN A WIRELESS COMMUNICATION NETWORK

(71) Applicant: Telefonaktiebolaget LM Ericsson (publ), Stockholm (SE)

(72) Inventors: Andres Reial, Malmö (SE); Bengt Lindoff, Bjärred (SE); Johan Nilsson, Höllviken (SE); Eliane Semaan, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 545 days.

(21) Appl. No.: 15/541,847

(22) PCT Filed: Jan. 27, 2017

(86) PCT No.: PCT/EP2017/051824
§ 371 (c)(1),
(2) Date: Jul. 6, 2017

(87) PCT Pub. No.: WO2018/137777
PCT Pub. Date: Aug. 2, 2018

(65) Prior Publication Data
US 2018/0279216 A1 Sep. 27, 2018

(51) Int. Cl.
*H04W 72/04* (2009.01)
*H04W 48/18* (2009.01)
*H04B 17/309* (2015.01)

(52) U.S. Cl.
CPC .......... *H04W 48/18* (2013.01); *H04B 17/309* (2015.01)

(58) Field of Classification Search
CPC ..... H04W 48/18; H04W 48/20; H04W 36/14; H04W 36/36; H04W 88/02; H04W 88/06; H04B 17/309; H04B 17/318
See application file for complete search history.

(56) References Cited

U.S. PATENT DOCUMENTS

| | | | |
|---|---|---|---|
| 2008/0014957 A1* | 1/2008 | Ore | H04W 36/0088 455/452.1 |
| 2009/0042601 A1* | 2/2009 | Wang | H04W 36/0088 455/553.1 |
| 2012/0252452 A1 | 10/2012 | Martin et al. | |

FOREIGN PATENT DOCUMENTS

| | | |
|---|---|---|
| AU | 2013100801 A4 * | 7/2013 |
| AU | 2013100801 A4 | 7/2013 |

(Continued)

OTHER PUBLICATIONS

Falowo, Olabisi E. et al., "Dynamic pricing for load-balancing in user-centric joint call admission control of next-generation wireless networks", International Journal of Communication Systems, Oct. 12, 2009, 1-34.

(Continued)

*Primary Examiner* — Hassan Kizou
*Assistant Examiner* — Mahbubul Bar Chowdhury
(74) *Attorney, Agent, or Firm* — Murphy, Bilak & Homiller, PLLC (57) ABSTRACT

Methods and apparatuses exemplified in this disclosure provide mechanisms for a wireless communication device to indicate its Radio Access Technology (RAT) preferences to a wireless communication network, and for a wireless communication network to consider the RAT preferences of a given device when deciding which RAT the device will use. As a non-limiting example of the advantages flowing from these mechanisms, devices operating within a network that includes or is associated with multiple RATs can indicate (Continued)

their preferences for which RAT they use, while still allowing the network to retain control of the RAT selection decisions. Such flexibility offers significant advantages in 5G networks that provide tight integration between multiple RATS—e.g., between LTE and NR air interfaces. However, the methods and apparatuses disclosed herein are not limited to 5G networks.

36 Claims, 4 Drawing Sheets

(56) References Cited

FOREIGN PATENT DOCUMENTS

| | | | |
|---|---|---|---|
| CN | 106358255 A | 1/2017 | |
| EP | 3021616 A2 | 5/2016 | |
| GB | 2485854 A | 5/2012 | |
| WO | 2008000914 A1 | 1/2008 | |
| WO | 2009021009 A1 | 2/2009 | |
| WO | 2010031331 A1 | 3/2010 | |
| WO | 2012135326 A2 | 10/2012 | |
| WO | WO-2013104129 A1 * | 7/2013 | ............... H04L 1/20 |
| WO | 2013112975 A1 | 8/2013 | |
| WO | 2014020560 A1 | 2/2014 | |
| WO | WO-2014020560 A1 * | 2/2014 | ............ H04W 48/18 |
| WO | 2014177186 A1 | 11/2014 | |
| WO | 2014186062 A1 | 11/2014 | |
| WO | 2015050671 A1 | 4/2015 | |
| WO | 2015152787 A1 | 10/2015 | |
| WO | 2016024809 A1 | 2/2016 | |

OTHER PUBLICATIONS

Falowo, Olabisi E. et al., "Load-Balancing in Heterogeneous Wireless Networks Implementing a User-Centric Joint Call Admission Control Algorithm", International Journal of Communications Systems, 2009, 1-6.

* cited by examiner

METHOD AND APPARATUS FOR INDICATING AND USING RADIO ACCESS TECHNOLOGY PREFERENCES IN A WIRELESS COMMUNICATION NETWORK

TECHNICAL FIELD

The present invention relates to wireless communication networks and particularly relates to a wireless communication device indicating Radio Access Technology, RAT, preferences to a wireless communication network, and a network selecting a RAT for use by a wireless communication device, based at least in pan on indicated RAT preferences.

BACKGROUND

Developing network technologies included under the broad term "5G" extend existing wireless network technologies into higher frequency bands, integrate the access and backhaul networks, support device-to-device, D2D, communications, provide flexible duplex operation and spectrum usage, user- and control-plane separation, multi-antenna transmission techniques, and an ultra-lean design that minimizes the number and complexity of always-on channels. Other terms finding common use to describe the umbrella of technologies encompassed by 5G network development include "Next Radio" or "New Radio", both of which are sometimes shortened to "NR".

Rather than being based on a specific radio access technology, 5G networks will draw on a portfolio of access and connectivity solutions, to support both extreme mobile broadband deployments as well as narrower-band deployments to support enhanced Machine Type Communication, eMTC, and Narrowband Internet of Things, NB-IoT, deployments involving potentially massive numbers of relatively low-rate devices. Further, while 5G development includes work on a new flexible air interface, dubbed "NR", 5G networks provide for tight integration of multiple radio access technologies, to provide ubiquitous connectivity, and significant flexibility in the allocation and use of RATs and their associated spectrum and bandwidth.

For example, 5G contemplates tight integration between the NR air interface and the Long Term Evolution, LTE, air interface. Integration of these two RATs means that a given user can be served using either or both air interfaces, depending on the capabilities and needs of the user and the involved wireless communication network. Tight integration of multiple air interfaces also supports service continuity, where LTE or other RATs may be used to support a user that is moving between "islands" of NR coverage. Here, the term "user" denotes a wireless communication device. e.g., a User Equipment or other communication apparatus, that is configured for operation in the wireless communication network in question.

The extent to which a given wireless communication device can make use of any one or more of the available RATs depends on the capabilities and configurations of the device, along with its reception conditions. Devices that have more than one radio or support wideband reception and processing encompassing more than one RAT can use more than one RAT at a time, at least to the extent that they are in areas having sufficient signal quality for more than one RAT. Other devices may not have the radio capabilities necessary to support use of more than one RAT at a time, or may not be in an area where more than one RAT has viability.

Other considerations include the operating mode of the device. Device mobility procedures may be divided into idle and active mode procedures. When a device is in idle mode, the network needs to be able to page the UE for call establishment or for updating the System Information, SI. Therefore, the network must know the tracking area of the device, for transmitting paging signals. The device, therefore, is expected to monitor tracking signals from the network and inform the network when it moves into a new tracking area.

In general, devices use a Discontinuous Reception Cycle, DRX, for such monitoring, where the DRX configuration of any given device specifies when the device should "wake up" and listen for relevant signals from the network. Depending on the device type, the DRX cycle may range from hundreds of milliseconds to several hours, or even days. If the device has been in low-power mode for an extended time, it also needs to establish synchronization for network signal reception. Preferably, the network transmits paging and tracking signals in close temporal proximity, so that they can be received during the same awake interval.

Notably, the energy consumption of a device operating in idle mode is largely determined by the DRX cycle period, the length of the reception window at each DRX cycle, and the energy required for operating the radio frequency, RF, circuitry and synchronization processing during each cycle. For a given device, the required energy consumption may differ markedly, in dependence on the particulars of the RAT being used for idle-mode operations.

When a device operates in active mode, rather than in idle mode, the network must ensure that it serves the device using the link or links that provide the device with the best service, or at least provide the device with acceptable service in relation to its communication needs. Identifying suitable links depends on, for example, measuring reception and transmission signal strengths or quality for existing or prospective links. Here, the term "links" may be understood as referring to radio connections and those connections may be tied to cells, sectors, transmission points, beams, etc., in dependence on how the network is arranged to provide coverage.

In an example implementation, the network transmits reference symbols, RS, corresponding to different coverage areas, cells, nodes, access points, base stations, etc., and a device returns measurement reports to the network. In turn, the network evaluates the viability of the associated radio link(s) for serving the device, based on the reported signal strength or quality. In general, the device provides reports for its current serving link(s) and one or more candidate links associated with neighboring coverage areas. The device, therefore, detects situations when a candidate link is becoming stronger than the serving link, and it may be configured with reporting conditions or event triggers that govern when the device informs the network about the possible need for handover of the device from a current serving link to a new serving link.

Such operations often extend to or otherwise involve the device imposing "gaps" on its operation with respect to one or more serving links, and using those gaps to make measurements on candidate links associated with one or more other RATs. Such measurements are referred to as inter-RAT measurements and, at least in tight integration scenarios, the network may schedule measurement gaps from the serving RAT, to allow the device to temporarily switch to another RAT and perform measurements.

Existing idle-mode and active-mode procedures are optimized to maximize network performance, in terms of overall capacity, cell throughput, load distribution, and other network-level key performance indicators, KPIs. While the decision to use a certain RAT to support a device is undertaken by the network based on measurement reports from the device, the decision serves the interests of the network and its selection may not be optimal for the device. For example, for a certain device that may have lower idle-mode power requirements when operating in one RAT versus another RAT—e.g., it may take less power for a device to operate in a sub-6 GHz band on the LTE air interface as compared to operation on the NR air interface at 15 GHz. However, by convention, the network would select the NR air interface for idle-mode use by the device, if load balancing algorithms in the network favored such use.

As a further example, the radio capabilities of a device may differ between RATs. The device may be capable of dual-antenna operation in one RAT but not in another RAT, but the RAT selection decision would conventionally be driven by network-centric considerations with device-capability information used only to infer the measurement and operating modes that are supported by a device. It is appreciated herein that the failure to consider which RATs or RAT-related configurations may be optimal or preferred by a device will become increasingly problematic in the 5G context, not least because 5G networks may be expected to host a wide range of device types, and may offer multiple RATs that are available for use within a given area or areas.

SUMMARY

Methods and apparatuses exemplified in this disclosure provide mechanisms for a wireless communication device to indicate its Radio Access Technology (RAT) preferences to a wireless communication network, and for a wireless communication network to consider the RAT preferences of a given device when deciding which RAT the device will use. As a non-limiting example of the advantages flowing from these mechanisms, devices operating within a network that includes or is associated with multiple RATs can indicate their preferences for which RAT they use, while still allowing the network to retain control of the RAT selection decisions. Such flexibility offers significant advantages in 5G networks that provide tight integration between multiple RATs—e.g., between LTE and NR air interfaces. However, the methods and apparatuses disclosed herein are not limited to 5G networks.

An example method of operation in a wireless communication device includes the device performing signal quality measurements for two or more RATs that are associated with a wireless communication network and are candidates for use in serving the wireless communication device. The method further includes determining RAT preferences with respect to the two or more RATs, based on evaluating the signal quality measurements and further based on evaluating one or more operational attributes associated with operating the device according to respective ones of the two or more RATs. Still further, the method includes the device indicating the RAT preferences to the network, to influence a RAT selection decision made by the network for the device.

In a related example, a wireless communication device comprises communication circuitry that is configured for communicating with a wireless communication network, and processing circuitry that is operatively associated with the communication circuitry. The processing circuitry is configured to perform signal quality measurements for two or more RATs that are associated with the network and are candidates for use in serving the device. Further, the processing circuitry is configured to determine RAT preferences with respect to the two or more RATs, based on evaluating the signal quality measurements and further based on evaluating one or more operational attributes associated with operating the device according to respective ones of the two or more RATs. and indicate the RAT preferences to the network, to influence a RAT selection decision made by the network for the device.

In a further related example, a computer program product comprises program instructions that, when executed by processing circuitry of a wireless communication device configured for operation in a wireless communication network, configure the device to perform signal quality measurements for two or more Radio Access Technologies, RATs that are associated with the network and are candidates for use in serving the device, determine RAT preferences with respect to the two or more RATs, based on evaluating the signal quality measurements and further based on evaluating one or more operational attributes associated with operating the device according to respective ones of the two or more RATs. The computer program product further comprises program instructions, the execution of which configures the device to indicate the RAT preferences to the network, to influence a RAT selection decision made by the network for the device.

In yet another device-side example, a wireless communication device configured for operation in a wireless communication network comprises a measuring module, a determining module, and an indicating module. The measuring module is configured to perform signal quality measurements for two or more RATs that are associated with the network and are candidates for use in serving the device, while the determining module is configured to determine RAT preferences with respect to the two or more RATs, based on evaluating the signal quality measurements and further based on evaluating one or more operational attributes associated with operating the device according to respective ones of the two or more RATs, and the indicating module is configured to indicate the RAT preferences to the network, to influence a RAT selection decision made by the network for the device.

On the network side, an example method of operation by a network node in a wireless communication network includes receiving an indication of RAT preferences of a wireless communication device, where the RAT preferences relate to two or more RATs that are associated with the network and are candidates for use in serving the device. The method further includes making a RAT selection decision for the device, wherein the RAT selection decision comprises selecting one of the two or more RATs for use by the device, based at least in part on the RAT preferences.

In a further related example, a network node comprises communication circuitry and processing circuitry. The processing circuitry is operatively associated with the communication circuitry and configured to receive, via the communication circuitry, an indication of RAT preferences of a wireless communication device. The RAT preferences relate to two or more RATs that are associated with the network and are candidates for use in serving the device, and the processing circuitry is further configured to make a RAT selection decision for the device. The RAT selection decision comprises selecting one of the two or more RATs for use by the device, based at least in part on the RAT preferences.

In another network-side example, a computer program product comprises computer program instructions that, when executed by processing circuitry of a network node configured for operation in a wireless communication network, configures the network node to receive an indication of RAT preferences of a wireless communication device. The RAT preferences relate to two or more RATs that are associated with the network and are candidates for use in serving the device. Further, the computer program product includes computer program instructions that configure the network node to make a RAT selection decision for the device, where the RAT selection decision comprises selecting one of the two or more RATs for use by the device, based at least in part on the RAT preferences.

In yet another example, a network node is configured for operation in a wireless communication network and comprises a receiving module and a selecting module. The receiving module is configured to receive an indication of RAT preferences of a wireless communication device. The RAT preferences relate to two or more RATs that are associated with the network and are candidates for use in serving the device, and the selecting module is configured to make a RAT selection decision for the device. The RAT selection decision comprises selecting one of the two or more RATs for use by the device, based at least in part on the RAT preferences.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
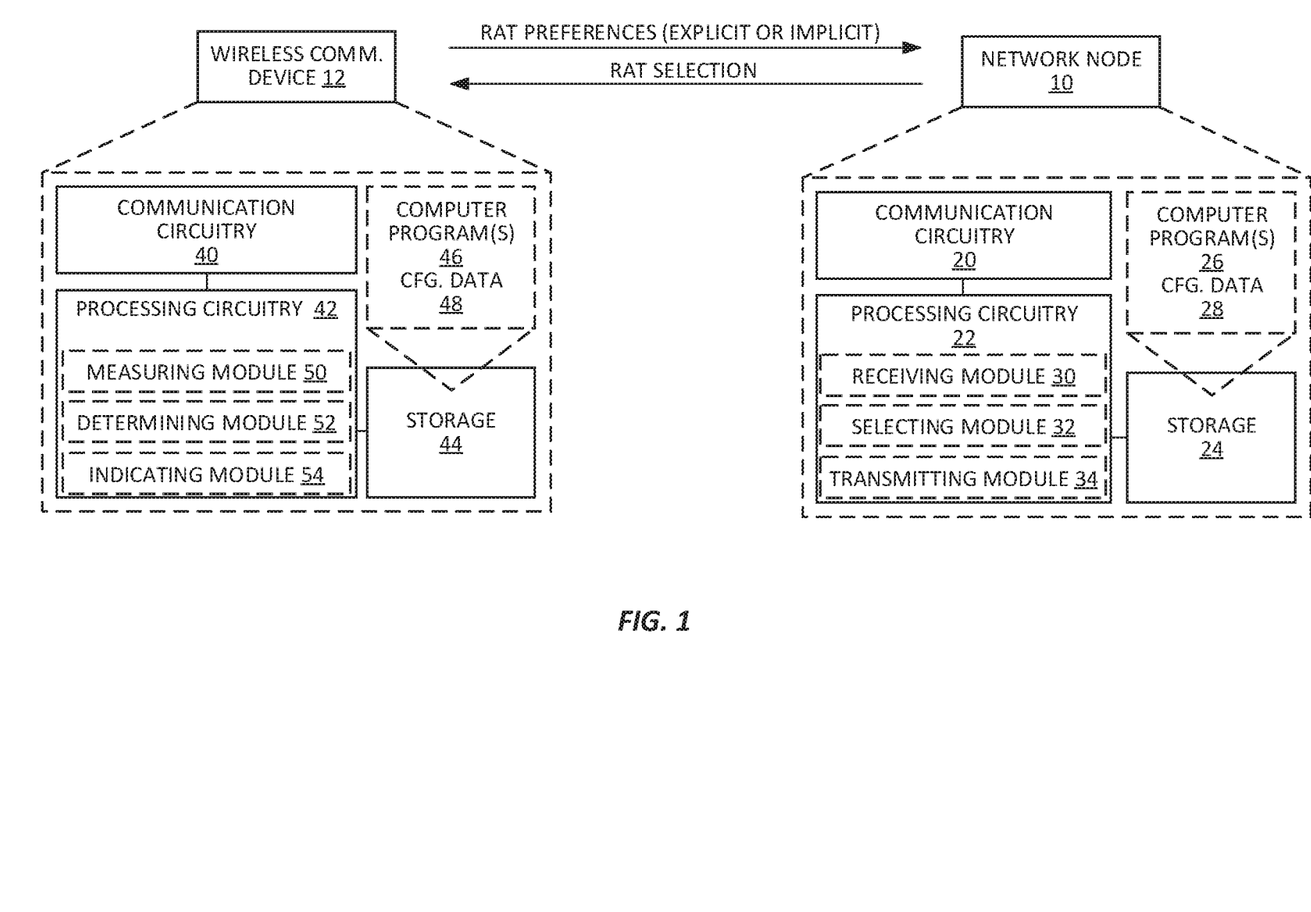
FIG. 1 is a block diagram of example embodiments of a network node and a wireless communication device.

FIG. 1 illustrates an example embodiment of a network node 10 and a wireless communication device 12. While the network node 10—node 10—appears as a single entity, it will be appreciated that the node 10 may be implemented across two or more physical nodes or entities within a wireless communication network, and its functionality may be implemented or duplicated within multiple nodes within the network, e.g., in each physical or logical division of the network.

As for the wireless communication device 12—device 12—it comprises essentially any type of wireless communication apparatus and may be referred to as a "User Equipment" or "UE" according to the standards promulgated by the Third Generation Partnership Project, 3GPP. Without limitation and by way of example only, the device 12 comprises a smartphone or other broadband multimedia device, such as a tablet or laptop computer with wireless connectivity, or a feature phone, a network modem or other wireless adaptor, a NB-IoT device, a MTC or eMTC device, etc. The device 12 may be mobile or may be operated in a fixed location, and it may alternate between idle-mode operation where it intermittently monitors one or more network signals but is otherwise "idle", and active-mode operation where it is engaged in data communications or other communication service(s).

According to the teachings herein, the node 10 operates within a wireless communication network that includes or is associated with two or more RATs that are candidates for use by the device 12, the device 12 is configured to indicate one or more RAT preferences to the network, and the node 10 is configured to consider the RAT preferences when deciding which RAT the device 12 should use. Such operation allows the device 12 to influence the RAT-selection decision made by the node 10, while leaving the network in control of the selection decision.

In an example implementation of the network-side and device-side functionality contemplated herein, the illustrated node 10 includes communication circuitry 20 and processing circuitry 22, which includes or is associated with storage 24 that stores one or more computer programs 26 and one or more items of configuration data 28. The nature of the communication circuitry 20 depends on what communications the node 10 is intended to support. In one example, the node 10 communicates directly with devices 12 via one or more air interfaces and includes radio transceiver circuitry configured for transmitting and receiving according to one or more RATs. The communication circuitry 20 may also include further interface circuits, such as for communicating with other nodes of the same or other types within the network. Alternatively, the node 10 is configured to communicate indirectly with devices 12 via one or more other nodes, and the communication circuitry 20 includes physical-layer and communication protocol processing circuitry for communicating with those one or more other nodes. Additionally, or as a further alternative, the node 10 does not communicate with devices 12 but nonetheless receive relevant information for given devices 12, based on communicating with one or more other nodes in the network, and in such embodiments the communication circuitry comprises physical-layer interface circuits and protocol processing circuits configured for communicating with such other node.

The processing circuitry 22 may be arranged as, or may functionally implement, a number of processing modules, including a receiving module 30, a selecting module 32, and a transmitting module 34. In general, the processing circuitry 22 comprises fixed circuitry or programmed circuitry, or a mix of fixed and programmed circuitry. In at least one embodiment, the processing circuitry 22 is configured at least in part to carry out the operations disclosed herein, based on executing the computer program instructions contained in the computer program(s) 26 held in the storage 24. In that regard, the storage 24 comprises one or more types of computer-readable media, and it may include a mix of non-volatile and volatile storage, such as long-term and working storage. By way of example, the storage 24 comprises any one or more of hard disk storage, solid state storage, FLASH, EEPROM, SRAM, and DRAM. As a further example, the processing circuitry 22 comprises any one or combination of microprocessor-based circuits, Digital Signal Processing, DSP, based circuits, Field Programmable Gate Array, FPGA, based circuits, Application Specific Integrated Circuit, ASIC, based circuits, or other digital processing circuitry.

Similarly, the illustrated device 12 includes communication circuitry 40 and processing circuitry 42, which includes or is associated with storage 44 that stores one or more computer programs 46 and one or more items of configuration data 48. The communication circuitry 40 includes radio transceiver circuitry configured for transmitting and receiving according to one or more RATs. The communication circuitry 40 may also include further interface circuits, such as for local or near-field communications, e.g., Bluetooth-based communications.

The processing circuitry 42 may be arranged as, or may functionally implement, a number of processing modules, including a measuring module 50, a determining module 52, and an indicating module 54. In general, the processing circuitry 42 comprises fixed circuitry or programmed circuitry, or a mix of fixed and programmed circuitry. In at least one embodiment, the processing circuitry 42 is configured at least in part to carry out the operations disclosed herein, based on executing the computer program instructions contained in the computer program(s) 46 held in the storage 44. In that regard, the storage 44 comprises one or more types of computer-readable media, and it may include a mix of non-volatile and volatile storage, such as long-term and working storage. By way of example, the storage 44 comprises any one or more of hard disk storage, solid state storage. FLASH, EEPROM, SRAM, and DRAM. As a further example, the processing circuitry 42 comprises any one or combination of microprocessor-based circuits, Digital Signal Processing, DSP, based circuits, Field Programmable Gate Array, FPGA, based circuits, Application Specific Integrated Circuit. ASIC, based circuits, or other digital processing circuitry.

Figure 2:
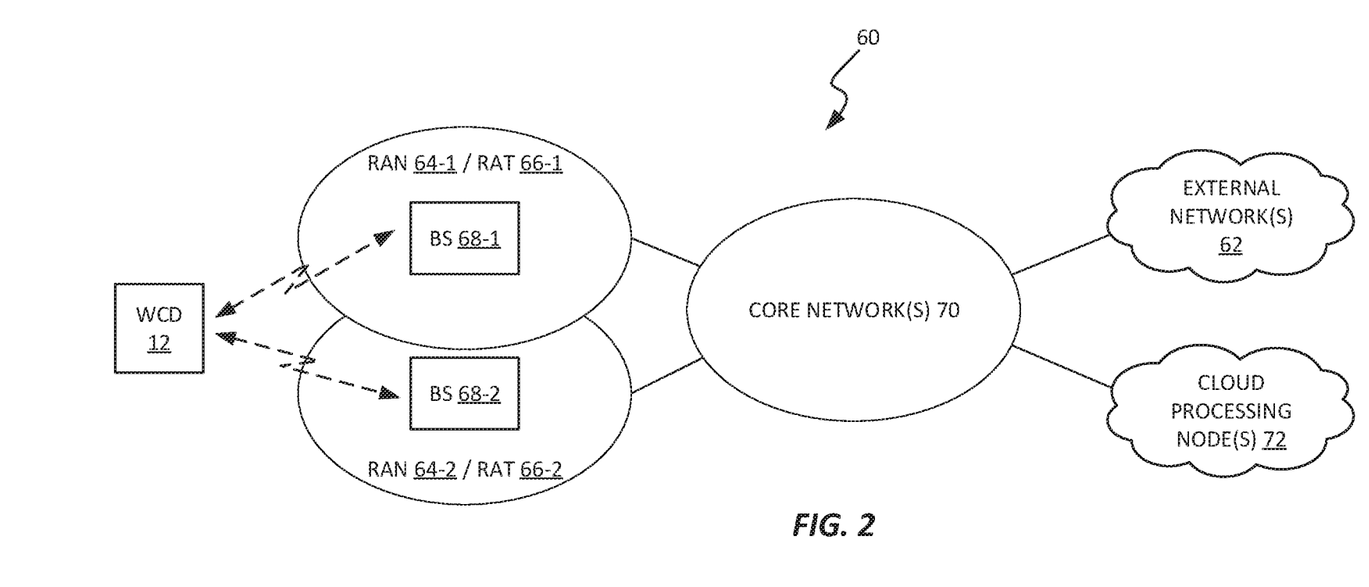
FIG. 2 is a block diagram of a wireless communication network that includes one or more nodes operative as the network node introduced in FIG. 1, and is configured to support the wireless communication device introduced in FIG. 1.

FIG. 2 illustrates an example wireless communication network 60—network 60—that provides one or more communication services to devices 12, e.g., by connecting the devices 12 to respective other devices or systems available in one or more external networks 62, such as the Internet. The network 60 includes or is associated with two or more RATs, which is shown in the diagram in terms of a first Radio Access Network, RAN, 64-1 that operates according to a first RAT 66-1, and a second RAN 64-2 that operates according to a second RAT 66-2. It should be understood that the network 60 may provide overlapping RAT coverage in any number of geographic areas, via multiple cells, sectors, beams, etc., such that a given device 12 may be operated in idle mode or active mode using a selected one of the available RATs 66. Here, "66" without suffixing denotes any one or more of the RATs associated with the network 60.

Figure 3:
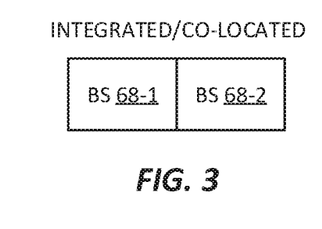
FIGS. 3 and 4 are block diagrams of example embodiments of integrated or co-located base stations and separate base stations, respectively.
Figure 4:
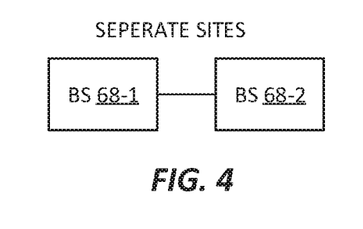

One or more core networks 70 interface to devices 12 via any one or more of the RANs 64 and the node 10 introduced in FIG. 1 may be located—and duplicated—within the RANs 64, such as where it is co-located or integrated with respective RAN base stations 68-1 and 68-2. FIGS. 3 and 4 illustrate example configurations for the base stations, BSs, 68-1 and 68-2. In FIG. 3, the two base stations 68-1 and 68-2 are integrated or co-located, e.g., integrated NR and LTE base stations. FIG. 4 depicts an alternative arrangement, where the base stations 68-1 and 68-2 are at separate sites, although they still may have overlapping coverage areas. It should also be understood that the term "base station" is used broadly herein, and encompasses access points, transmission points, and various other radio nodes that provide radio connectivity to devices 12.

Further, while not explicitly shown, the node 10 may be implemented within the core network(s) 70, or may be implemented in one or more cloud-based processing nodes 72. In an example of the cloud-based implementation, the network 60 may have access to centralized processing resources, e.g., a number of servers or virtualized servers, that are communicatively coupled to the core network(s) and provide various processing functions to the network 60.

In the context of FIGS. 1 and 2, the node 10 is associated with a wireless communication network 60 and includes, in an example embodiment, communication circuitry 20 and processing circuitry 22 that is operatively associated with the communication circuitry 20. The processing circuitry 22 is configured to receive, via the communication circuitry 20, an indication of RAT preferences of a device 12, the RAT preferences relating to two or more RATs 66-1 and 66-2 that are associated with the network 60 and are candidates for use in serving the device 12. Further, the processing circuitry 22 is configured to make a RAT selection decision for the device 12, where the RAT selection decision comprises selecting one of the two or more RATs for use by the device 12, based at least in part on the RAT preferences.

The processing circuitry 22 in one or more embodiments is configured to receive one or more explicit indicators, as the indication of RAT preferences, and determine the RAT preferences from the one or more explicit indicators.

The indication of the RAT preferences indicates, for example, a degree of preference or non-preference for one or more of the two or more RATs 66-1, 66-2. Correspondingly, the processing circuitry 22 in such embodiments is configured to control an extent to which the RAT preferences influence the RAT selection decision in dependence on the indicated degree of preference or non-preference.

In another example embodiment or instance, to select one of the two or more RATs 66-1, 66-2 for use by the device 12, the processing circuitry 22 is configured to: (a) receive a measurement report from the device 12 that indicates measured signal levels or qualities for respective ones of the two or more RATs 66-1, 66-2; (b) obtain adjusted signal levels or qualities by adjusting one or more of the measured signal levels or qualities, according to the RAT preferences; and (c) make the RAT selection decision based on the adjusted signal levels or qualities. Here, the RAT preferences comprise one or more signal level or signal quality offset values, each such offset value being used to adjust a corresponding one of the measured signal levels or qualities.

In another example embodiment or instance, the processing circuitry 22 is configured to receive the indication of RAT preferences by receiving at least one of the following indications for at least one of the two or more RATs 66-1, 66-2: an indication of preference, an indication of non-preference, and an indication of infeasibility. In such embodiments or instances, the processing circuitry 22 is configured to exclude from consideration in the RAT selection decision any RAT for which an indication of infeasibility is received.

As for considering indicated RAT preferences, in one or more embodiments, the processing circuitry 22 is configured to make an initial RAT selection and conditionally adjust the initial RAT selection in dependence on the RAT preferences. Alternatively, the processing circuitry 22 is configured to adjust one or more values used to make the RAT selection decision, as a function of the RAT preferences, and evaluate the one or more values after the adjustment. Here, the indications of RAT preferences could be offsets or adjustment values to be applied by the network 60 to the one or more values used to make the RAT selection decision. Whether the indications are so formulated, in one or more embodiments, the processing circuitry 22 is configured to receive the indication of the RAT preferences in a measurement report sent by the device 12 for the two or more RATs 66-1, 66-2.

In at least one embodiment, the processing circuitry 22 is configured to perform a biased evaluation by biasing, based on the RAT preferences, an evaluation of relative costs or benefits for the wireless communication network 60 regarding use by the device 12 of respective ones of the two or more RATs 66-1, 66-2, and make the RAT selection decision in dependence on the biased evaluation. Alternatively, the processing circuitry 22 is configured to perform an unbiased evaluation of relative costs or benefits for the network 60 regarding use by the device 12 of respective ones of the two or more RATs 66-1, 66-2, make an initial RAT selection decision in dependence on the unbiased evaluation, and conditionally modify the initial RAT selection decision as a function of the RAT preferences.

In a related embodiment, a computer program product 26 comprises computer program instructions that, when executed by the processing circuitry 22, configures the network node 10 to: receive an indication of RAT preferences of the device 12, where the RAT preferences relate to two or more RATs 66-1, 66-2 that are associated with the network 60 and are candidates for use in serving the device 12; and make a RAT selection decision for the device 12, where the RAT selection decision comprises selecting one of the two or more RATs 66-1, 66-2 for use by the wireless communication device 12, based at least in part on the RAT preferences. Such use may be for idle-mode operation of the device 12, or for active-mode operation of the device 12, and it should be understood that the preferences and associated costs or benefits of using one RAT 66 versus another RAT 66 may depend on which mode of device operation is involved.

Figure 5:
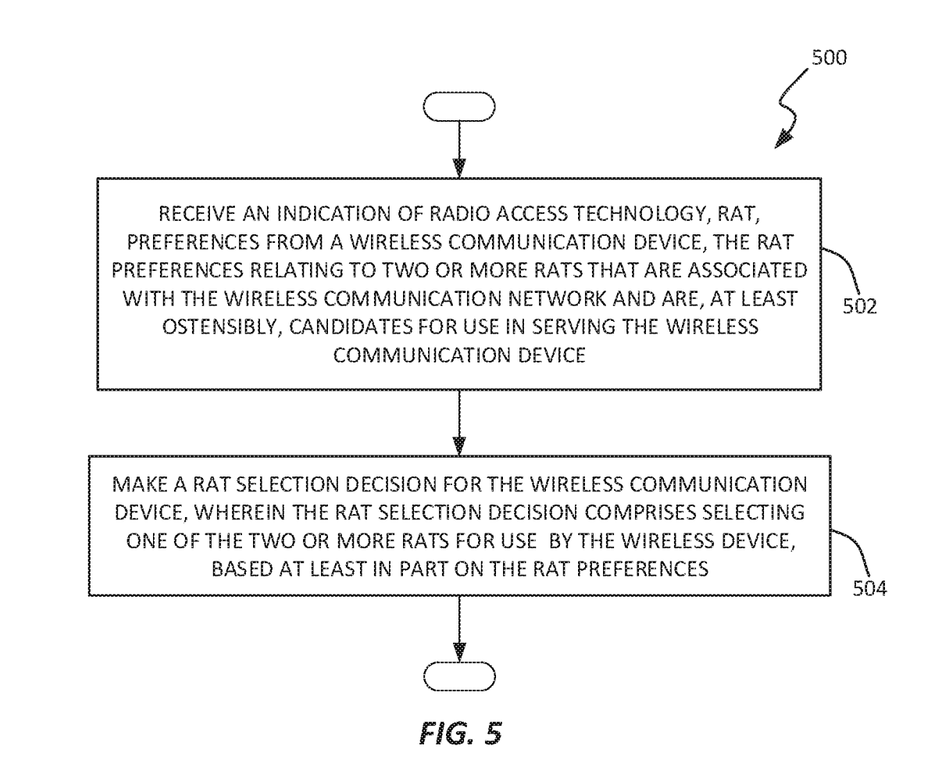
FIG. 5 is a logic flow diagram of an example embodiment of a method of processing at a network node.

FIG. 5 illustrates one embodiment of a method 500 of operation by the node 10, with the method 500 including receiving (Block 502) an indication of RAT preferences of a device 12, the RAT preferences relate to two or more RATs 66-1, 66-2 that are associated with the network 60 and are candidates for use in serving the device 12. The method 500 further includes the node 10 making (Block 504) a RAT selection decision for the device 12, where the RAT selection decision comprises selecting one of the two or more RATs 66-1, 66-2 for use by the device 12, based at least in part on the RAT preferences. Here, the device 12 may be configured to operate in the selected RAT 66 via higher-layer, e.g. layer 3 (L3) or radio resource control (RRC) signaling. One or more network nodes may also be configured accordingly for operation with the selected RAT 66, e.g., via L3 interfaces.

Correspondingly, the aforementioned receiving module 30 of FIG. 1, is configured in one or more embodiments to receive an indication of RAT preferences of the device 12 and the selecting module 32 is configured to make a RAT selection decision for the device 12, based at least in part on the RAT preferences of the device 12. The transmitting module 34 outputs control signaling or information indicating the RAT selection decision, e.g., to inform the device 12 of the RAT selection decision. Hence, in this example, the network node (10) is configured for operation in a wireless communication network (60) and comprises a receiving module configured to receive an indication of Radio Access Technology. RAT, preferences of a wireless communication device (12), the RAT preferences relating to two or more RATs (66-1, 66-2) that are associated with the wireless communication network (60) and are candidates for use in serving the wireless communication device (12) and it comprises a selecting module configured to make a RAT selection decision for the wireless communication device (12), wherein the RAT selection decision comprises selecting one of the two or more RATs (66-1, 66-2) for use by the wireless communication device (12), based at least in part on the RAT preferences.

Turning to device-side aspects of the teachings herein, in one or more embodiments of the device 12, the communication circuitry 40 is configured for communicating with the network 60 and the processing circuitry 42 is operatively associated with the communication circuitry 40 and configured to perform a number of operations associated with indicating RAT preferences to the network 60. In at least one embodiment, the processing circuitry 42 is configured to: perform signal quality measurements for two or more RATs 66-1, 66-2 that are associated with the network 60 and are candidates for use in serving the device 12; determine RAT preferences with respect to the two or more RATs 66-1, 66-2, based on evaluating the signal quality measurements and further based on evaluating one or more operational attributes associated with operating the device 12 according to respective ones of the two or more RATs 66-1, 66-2; and indicate the RAT preferences to the network 60, to influence a RAT selection decision made by the network 60 for the wireless communication device 12.

In an example, a given RAT 66 is a "candidate" for use in serving the device 12 if the device 12 receives reference or broadcast signals associated with the RAT 66 at a level or quality sufficient to make use of the RAT 66 viable. The device 12 may, for example, be able to detect signals from a given RAT 66 but not include that given RAT 66 in its reporting or in its preference determinations, if the signal levels for the RAT 66 are below some defined threshold. In other approaches, any RAT 66 seen by the device 12 may be considered as a candidate, at least in some nominal sense, but the device 12 may determine its preferences such that any RATs 66 associated with signal levels or qualities below the point of feasibility are associated with negative preferences, or are flagged as being infeasible.

Of course, infeasibility may arise not because of poor reception conditions but rather as a consequence of the characteristics of the given RAT 66 in relation to the operational capabilities or state of the device 12. Correspondingly, in a broad example embodiment, the processing circuitry 42 is configured to indicate RAT preferences by indicating at least one of: a preferred RAT indication to bias the RAT selection decision towards a preferred RAT, a non-preferred RAT indication to bias the RAT selection decision away from a non-preferred RAT, and an infeasible RAT indication to prevent selection of an infeasible RAT.

In at least one such example, the processing circuitry 42 is configured to indicate the RAT preferences by explicitly indicating the RAT preferences to the network 60. In other embodiments or instances, the processing circuitry 42 is configured to implicitly indicate the RAT preferences to the network 60.

The processing circuitry 42, for example, is configured to indicate its RAT preferences in a signal quality measurement report sent by it to the network 60. The measurement report approach supports either implicit or explicit signaling. For example, the device 12 can include explicit indicators in the measurement report, e.g., flags, values, etc., that represent one or more RAT preferences. Alternatively, rather than adding explicit RAT preference indicators, the processing circuitry 42 may adjust—e.g., increase or decrease—one or more RAT-specific measurements included in the measurement report, which can be understood as implicitly indicating preferences by negatively or positively biasing RAT-specific measurements.

Such biasing makes a given RAT measurement look better or worse than it is, to make the RAT appear to the network 60 as being more favorable or less favorable for use by the device 12. And, as noted, the measurement reporting may involve a certain amount of prescreening by the device 12, in the sense that it may include in the report only those RATs 66 that meet minimum received-signal level requirements at the device 12.

In at least some embodiments, or in some instances, the processing circuitry 42 is configured to indicate the RAT preferences by indicating a degree of preference or non-preference for one or more of the two or more RATs 66-1, 66-2. Such operation allows the device 12 to indicate the extent to which a RAT 66 is preferred or not preferred, and it provides a good mechanism for enabling the RAT-selection decision to be weighted by the network 60, e.g., in proportion to the indicated preferences or non-preferences. Such weightings may be particularly useful when there is a significant cost or benefit associated with one RAT 66 versus another RAT 66, or when there are several RATs 66 to choose from.

The device 12 may use weighted reporting as a default, or it may use weighted reporting responsive to determining that the network 60 supports weighted reporting. Otherwise, the device 12 may default to simple flags or indicators, e.g., an indicator indicating which one of the candidate RATs 66 is preferred by the device 12, or an indicator indicating which one(s) of the candidate RATs 66 are infeasible for use by the device 12. Additionally, or alternatively, the device 12 may provide "base" signaling, such as one or more simple flags, and provide "extended" or enhanced signaling that provides preference weights or other relative indications of preference or non-preference. The base and enhanced signaling may be sent together, or may be sent separately, in dependence on whether or to what extent the network 60 supports the enhanced signaling.

In an example of explicit signaling of RAT preferences, the processing circuitry 42 of the device 12 is configured to indicate the RAT preferences by sending one or more flags. Each flag corresponds to one of the two or more RATs 66-1, 66-2, and each flag signifying that the corresponding RAT is one of: preferred, non-preferred, and infeasible.

However the preferences are indicated, in one or more embodiments, the device 12 determines its preferences based on one or more operational attributes that depend on or are impacted differently by different RATs 66. Broadly, the operational attributes may correspond to relative costs or benefits for the device 12 when operating according to respective ones of the two or more RATs 66-1, 66-2. In an example, the one or more operational attributes comprise a power consumption of the device 12 when operating according to respective ones of the two or more RATs 66-1, 66-2. A first RAT 66-1 may correspond to higher operating power at the device 12, as compared to a second RAT 66-2, in one example case. Additionally, or alternatively, the one or more operational attributes comprise at least one of: a level of activity or computational complexity required of the device 12 when operating according to respective ones of the two or more RATs 66-1, 66-2, radio configurations or capabilities of the device 12 when operating according to respective ones of the two or more RATs 66-1, 66-2, quality-of-service requirements associated with any ongoing or planned communications by the device 12, and a state of charge of a battery used to power the wireless communication device 12.

By way of a specific example, the device 12 estimates its expected power consumption for operating in RAT 66-1 and for operating in RAT 66-2. The device 12 then compares the respective power-consumption estimates and determines whether it has a preference for RAT 66-1 over RAT 66-2, or vice versa, based on the power consumption estimates. For example, if the difference in estimated power consumption between the two RATs 66-1 and 66-2 exceeds a threshold, the device 12 considers the RAT associated with the lower power consumption as being preferred. The power-consumption estimation may use information about the current network configurations, such as Discontinuous Reception or DRX cycles, etc., in the two RATs 66-1 and 66-2. Further, the threshold for deciding that one of the RATs 66 is preferred can depend on the battery state of the device 12. More generally, whether or the extent to which RAT-dependent estimates of power consumption drive RAT preferences at the device 12 can be tied to or weighted by the battery state of the device 12.

As another example, the device 12 compares the computational load expected in the two RATs 66-1 and 66-2 and determines whether the processing overhead associated with operation in the RAT 66 having the heavier computational load will limit the device's data demodulation/decoding ability. If so, the device 12 may consider the lower-overhead RAT 66 to be preferred. Of course, the device 12 may evaluate multiple parameters for the respective RATs 66 and make a joint evaluation of those parameters to determine preferences. In one variation of that approach, there may be one or more points of comparison that are more important than others, and the preference-determination processing may compare the RATs 66 on different points, in the order of importance, e.g., power consumption first, computational load second, etc.

Figure 6:
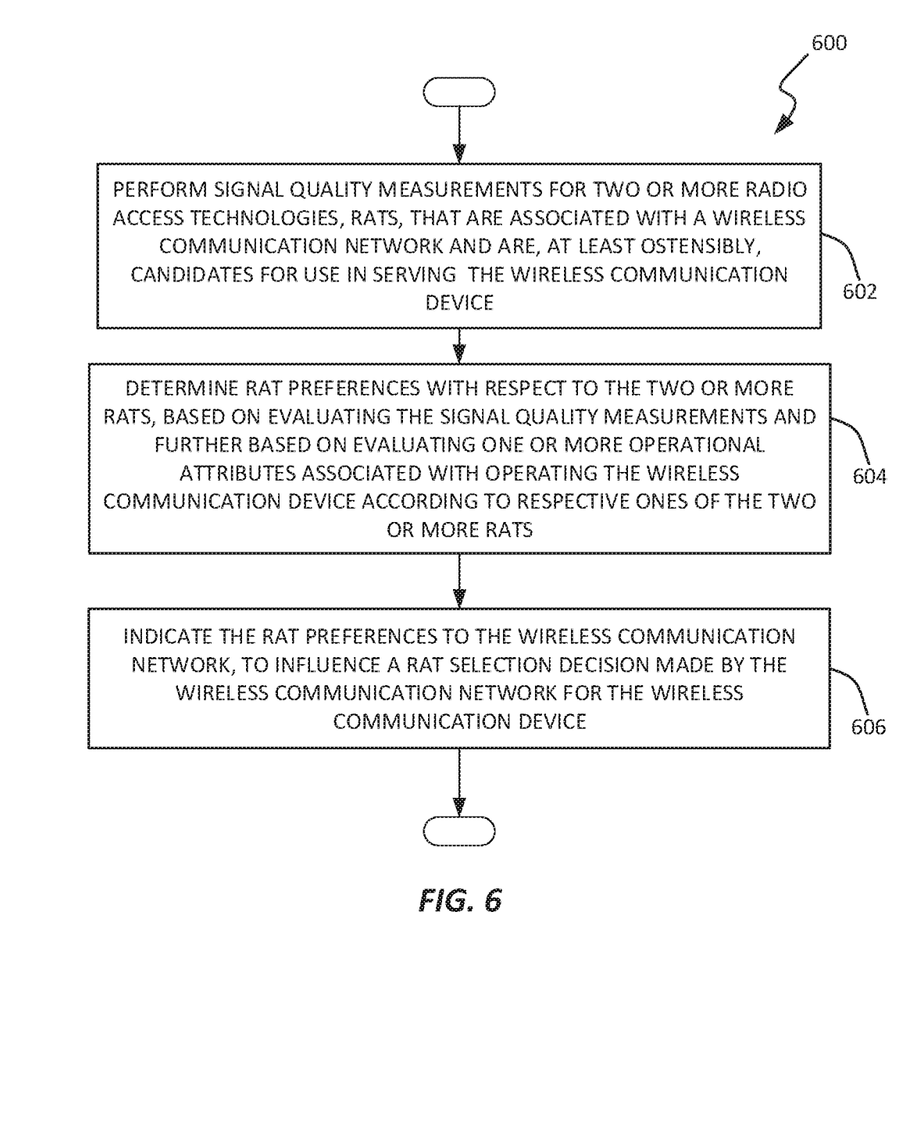
FIG. 6 is a logic flow diagram of an example embodiment of a method of processing at a wireless communication device.

FIG. 6 illustrates a method 600 of operation performed by a device 12, and it includes performing (602) signal quality measurements for two or more RATs 66-1, 66-2 that are associated with a network 60 and are candidates for use in serving the device 12, and determining (604) RAT preferences with respect to the two or more RATs 66-1, 66-2. The preference determinations are based on evaluating the signal quality measurements and further based on evaluating one or more operational attributes associated with operating the device 12 according to respective ones of the two or more RATs 66-1, 66-2. The method 600 further includes indicating (606) the RAT preferences to the network 60, to influence a RAT selection decision made by the network 60 for the device 12.

In a corresponding example implementation, the measuring module 50 implemented via the processing circuitry 42 of the device 12—see FIG. 1—is configured to perform signal quality measurements for two or more RATs 66-1, 66-2 that are associated with a network 60 and are candidates for use in serving the device 12, while the determining module 52 is configured to determine RAT preferences as described above. Further, the indicating module 54 is configured to indicate the RAT preferences to the network 60, to influence the RAT selection decision made for the device 12. Hence, in this example, the wireless communication device (12) is configured for operation in a wireless communication network (60) and comprises a measuring module configured to perform signal quality measurements for two or more Radio Access Technologies. RATs (66-1, 66-2) that are associated with the wireless communication network (60) and are candidates for use in serving the wireless communication device (12); a determining module configured to determine RAT preferences with respect to the two or more RATs (66-1, 66-2), based on evaluating the signal quality measurements and further based on evaluating one or more operational attributes associated with operating the wireless communication device (12) according to respective ones of the two or more RATs (66-1, 66-2); and an indicating module configured to indicate the RAT preferences to the wireless communication network (60), to influence a RAT selection decision made by the wireless communication network (60) for the wireless communication device (12).

Another example implementation comprises a computer program product, such as the computer program 46 shown in FIG. 1, wherein the computer program product comprises program instructions that, when executed by the processing circuitry 42, configure the device 12 to: perform signal quality measurements for two or more RATs 66-1, 66-2 that are associated with a network 60 and are candidates for use in serving the device 12; determine RAT preferences with respect to the two or more RATs 66-1, 66-2; and indicate the RAT preferences to the network 60.

The foregoing examples address a number of key points recognized herein, including the point that when a device 12 performs signal quality measurements for several RATs 66 that are available with respect to a network 60, not all RATs 66 are equally suitable or efficient for the device 12. While retaining ultimate RAT selection control in the network 60 may be advantageous, the teachings herein allow the device 12 to indicate its RAT preferences to the network 60, which may follow those preferences unless they conflict with other considerations in play at the network level. As noted, the preferences may be explicit or implicit and may be binary or logical flags, or may be weighted values—e.g., indexed or quantized values, or real-valued scalars reflecting relative preference weights.

As for implicit indicators, one approach involves reporting a zero or artificially low signal strength or quality for a RAT 66 that is not preferred, or less preferred. The zero-valued reporting may be used expressly in cases where the RAT 66 in question is not feasible for use by the device 12, e.g., because of radio capability limitations, lack of remaining battery life, etc. The determination of infeasibility may depend on the current operating mode of the device 12, e.g., in dependence on whether usage is considered for the case of idle-mode operation or for the case of active-mode operation. In at least one approach to implicit indication, the device 12 adds a RAT-specific offset to the reported signal quality value. For example, a negative offset may be applied to a RAT 66 that requires excessive energy consumption at the device 12. As another example, a RAT 66 where the device 12 is unable to operate in its current operating mode may be reported with zero signal quality.

Of course, the above examples are non-limiting and other formulations are contemplated both in the explicit and implicit approaches to RAT preference indication. Further, the indication and RAT preferences by a device 12 and the consideration of such preferences by a network 60 may be extended to scenarios involving Carrier Aggregation (CA) and to multiple-connectivity configurations, where multiple links are used to support the device 12. In any case, the teachings herein enable a device 12 to steer the RAT selection decision towards a better-performing, more energy-efficient, or simply technically feasible operating mode. At the same time, the approach still leaves the final RAT selection control to the network 60, at least in cases where the RAT preference is a soft preference, not a hard limitation, such as an indication of infeasibility. Devices 12 from a wide range of device types can, therefore, improve their efficiency in idle and/or active mode operation, without requiring the network 60 to have prior knowledge of their particular characteristics or attributes regarding the different RATs 66 that may be available in the network 60.

In an example of performing signal quality measurements for two or more RATs 66-1, 66-2, the device 12 may perform measurements known for idle-mode operation, or for system access and cell reselection. Example signals measured by the device 12 include Primary Synchronization Channel. P-SCH, and Secondary Synchronization Channel, S-SCH, signals such as are available in 3G RANs. Similarly, the device 12 may measure Primary Synchronization Signals, PSS, and Secondary Synchronization Signals, SSS, in 40 RANs, and SSS in 5G RANs. Additionally, or alternatively, the device 12 may base its measurements on common pilot signals, e.g., Common Pilot Channel, CPICH, or other generally available signals. The measurements may also be dependent or related to active mode mobility, such as CPICH or Cell Reference Symbols, CRS, in 3G and 4G RANs, respectively, or NR-PSS, NR-SSS, Mobility Reference Symbols, MRS, or other mobility-related signals in 5G. Further signal examples include active mode data-plane transmissions, such as CSI-RS or DM-RS, Channel Quality Indicator, CQI, or Channel State Information, CSI, transmissions.

As for determining which RAT(s) 66 are attractive or unattractive for use, the device 12 may evaluate any number of operational attributes associated with the respective RATs 66. The evaluation may involve direct comparisons, such as comparing the power consumption known or expected for operation in one RAT 66 in comparison to that known or expected for another RAT 66. Such a comparison may be performed in general, or only when the device 12 is operating in view of a power constraint, such as a low battery. Additionally. or alternatively, the device 12 may consider differences in DRX or other configurations as between the available RATs 66, and/or may evaluate known or expected differences in signal transmissions or receptions required for the different RATs, differences in baseband processing complexity. The device 12 may also consider whether any particular performance or regulatory constraints or requirements attend one or more of the RATs 66, e.g., limits on spectral leakage, etc.

The device 12 may also consider operational or design limitations at the device 12 that prevent it from supporting certain features or operations associated with a given RAT 66. As a general proposition, the device 12 may decide whether a given RAT 66 is feasible, and, assuming that more than one such RAT 66 is available, may evaluate or compare the candidate RATs 66 to determine its preferences, e.g., based on determining which RAT 66 best complements its design or operational capabilities, or offers it the lowest power or least demanding operating characteristics. The device 12 may indicate the one RAT 66 that is preferred, or it may indicate that any of two or more RATs 66 are preferred, with or without resolving whether one is more preferred than the others, or it may provide prioritized rankings, e.g., most preferred, next-most preferred, and so on. And, of course, the device 12 may provide "hard" indications, to flag RATs 66 that are infeasible for use.

Thus, at least three type of indications or indication scenarios apply: (1) a case where more than one RAT 66 is feasible for use by the device 12, but where the device 12 prefers one of them, e.g., due to exceptional energy efficiency: (2) a case where more than one RAT 66 is feasible for use by the device 12, but where the device would prefer not to operate in in one of them, e.g., due to poor energy efficiency; and (3) a case where the device 12 is unable to operate in an available RAT 66, e.g., because of hardware limitations associated with simultaneous operation in other modes, for instance intermodulation issues due to poor combination of carrier frequencies. As an example of infeasibility, consider a device that provides multi-mode support but shares certain hardware resources between modes. Such a device may be able to support high-rate streaming on a Wi-Fi connection concurrent with LTE operation, but not concurrent with a NR connection because of the higher computational complexity associated with NR operation.

For Cases 1 and 2, the positive or negative preference may be expressed as a binary flag associated with the relevant RATs 66, or as a quantitative indicator, e.g., on the scale of 0 to 3, that expresses how strong the preference is. The negative and positive preferences may also be expressed in a common scale for every RAT 66, e.g., each RAT 66 is rated in the range of −4 to 3. However expressed, the device 12 may use any number of approaches to formulating and indicating such preferences. In one approach, the device 12 measures signal quality on a per RAT basis and reports the measurement values "as is" and sends corresponding preference information, e.g., indicator flags or indices for one or more of the RATs 66 for which measurements are reported. Alternatively, the device 12 uses its determined preferences to adjust or modify the measurement values obtained by it for one or more of the RATs 66, e.g., by applying e.g. +3 dB offset to a single quality metric associated with a preferred RAT 66, or by applying a negative offset to the signal quality metric associated with a non-preferred RAT 66.

On the network side, the network 60, e.g., by operation of the node 10, considers the RAT preferences indicated by a device 12 when selecting a RAT 66 for the device 12 to use. In an example case, the device 12 sends an indication that a particular RAT 66 is preferred and the network 60 considers the cost of allocating that RAT 66 to the device 12. The costs may be one or more of reduced capacity, increased load in some RAT 66, reduced link performance, problems associated with channel access failures, e.g., if the preferred RAT 66 operates in an unlicensed frequency band, mobility performance in terms of handover selection errors or latency, etc.

If the costs are not prohibitive, the network 60 may assign the device 12 to the preferred RAT 66. If the preference indicator indicates a non-preferred RAT 66. i.e., one that the device 12 preferably would not like to use, a similar cost analysis for excluding that RAT 66 from selection is performed. If the cost is not prohibitive, the device 12 is allocated to one of the other available RATs 66. Finally, if the preference indicator indicates that the device 12 is currently unable to operate in some certain RAT 66, that RAT 66 is excluded from the selection without an associated cost analysis.

In a further example illustration, assume that a device 12 is capable of operating in a first RAT 66, RAT 1, and in a second RAT 66, RAT 2. RAT 1 is, for example, LTE, and RAT 2 is the NR interface associated with 5G or NR. RAT 1 provides frequent idle mode synch and measurement signals, i.e., CRS is constantly ON, and PSS/SSS are provided every 5 milliseconds. Contrariwise, RAT 2 provides a relatively sparse set of always-on, idle-mode measurement signals, e.g., NR-PSS/NR-SSS are provided every 40 milliseconds.

Further assume that RAT 1 operates as a macro coverage layer and that RAT 2 provides small-cell coverage overlaid within the macro coverage area, and that the device 12 is operating in idle mode, where it monitors serving cell and neighboring cell signal quality measurements, to ensure that it is always connected to the strongest available cell, subject to any overriding RAT preferences. When the device 12 operates with long DRX cycle times in idle mode, it may lose synchronization between measurement occasions and, therefore, must reacquire synchronization with the network 60 using the available synchronization signals. In such a scenario, performing idle-mode measurements in RAT 2 implies higher power consumption at the device 12, because of the larger synchronization search windows needed for obtaining or re-obtaining synchronization in RAT 2.

Therefore, while both RAT 1 and RAT 2 are feasible, the device 12 would enjoy lower power consumption in RAT 1. Because idle-mode operation for the device 12 is more efficient in RAT 1, and assuming that there are no offsetting considerations, the device 12 would indicate its preference for RAT 1 to the network 60. Such operations allow the network 60 to bias its RAT selection decision towards the RAT 66 that is most advantageous for the device 12, without having to know the details underlying that preference.

Further, while the indicated preferences bias or otherwise influence the RAT selection decision, the network 60 remains free to make RAT selection decisions that do not necessarily conform to the indicated preferences. Consequently, the network 60 remains free to evaluate costs based on loading, reported channel qualities, resource availability, RAN/RAT statuses, etc. And, as noted, the network 60 may make a sophisticated evaluation of the preferences, particularly when the preferences are multi-valued indicators, e.g., a ranged value that indicates the urgency or weight of preference.

In one example, the degree to which a given device 12 prefers a particular RAT 66 may depend on its remaining battery life. Thus, the network 60 may receive a relatively low-urgency preference indication from the device 12 at one point in time, and then receive a relatively high-urgency preference indication from the device 12 at another time, and the degree to which its RAT selection decision is biased changes based in the indicated urgency. Or, it may be that the nature of the device 12 requires operation at the lowest possible power at all times. For example, the device 12 may be an IoT device and it may always express a preference for the RAT 66 that it offers it the lowest power consumption during operation.

As a further possibility, in cases where the RAT preference indications are considered directly in the decision process, rather than being used to possibly revise a tentative RAT selection, the network 60 may adjust the RAT preferences received from a device 12, to reflect its own preferences. Those further-adjusted RAT preferences are then used to make the preference-biased RAT selection decision. Such an approach allows the network 60 to modify the RAT preferences provided by the device 12, to reflect its own preferences, e.g., in terms of the "cost" of using one RAT 66 versus another RAT 66, from the perspective of the network 60.

Further consider an example where the measurements made by a device 12 for a first RAT 66, RAT 1, are based on signals that are not beamformed for the benefit of the device 12, while the measurements made by the device 12 for a second RAT 66. RAT 2, are based on beamformed signals transmitted for the device 12. The RAT 2 signals also may be broadband signals that result in higher apparent signal quality because of their frequency diversity, and it may be that RAT 2 offers generally higher data rates than are achievable in RAT 1.

However, according to the teachings herein, the device 12 may decide whether RAT 1 or RAT 2 is more "attractive" to it, based on its current operating mode and needs, and indicate those preferences to the network 60. For example, the device 12 may not need high-data-rate service and it may be that a link with RAT 1 is sufficient to meet its needs. Thus, if RAT 1 offered greater power efficiency or other advantages for the device 12, it would indicate a preference for RAT 1 over RAT 2, despite RAT 2 being associated with better received signal quality at the device 12. The device 12 provides that preference either explicitly, by indicating that RAT 1 is preferred over RAT 2 via one or more flags or ranged values, or implicitly, by adjusting the measurement report to make RAT 1 look more attractive that it would look absent such adjustments.

Generally, when making preference distinctions between available RATs 66, the device 12 may consider its own capabilities and attributes, in terms of computational processing, radio configurations, operational efficiencies, and any applicable constraints or requirements, such as remaining battery power, interference limitations, etc. Any such considerations may be extended to, or modified by the specific scenario involved. For example, the device 12 may determine its preferences in dependence on specific factors associated with CA or multiple-connectivity operation, which generally places greater demands on the radio frequency (RF) circuits and related processing resources of the device 12. And, as mentioned, other factors considered in the preference determination may be whether a given RAT 66 operates in a licensed or unlicensed frequency band, where unlicensed operation implies carrier-sensing based collision avoidance, Listen-Before-Talk, LBT, operation, or other "overhead" complexities.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of operation in a wireless communication device, the method comprising:

performing signal quality measurements for two or more Radio Access Technologies (RATs) that are associated with a wireless communication network and are candidates for use in serving the wireless communication device;

determining RAT preferences with respect to the two or more RATs, based on evaluating the signal quality measurements and further based on evaluating one or more operational attributes associated with operating the wireless communication device according to respective ones of the two or more RATs; and indicating the RAT preferences to the wireless communication network, to influence a RAT selection decision made by the wireless communication network for the wireless communication device, wherein indicating the RAT preferences comprises explicitly or implicitly indicating the RAT preferences in a signal quality measurement report sent by the wireless communication device to the wireless communication network for the two or more RATs, wherein explicitly indicating the RAT preferences comprises including one or more explicit indicators in the signal quality measurement report and wherein implicitly indicating the RAT preferences comprises biasing one or more signal quality measurements indicated in the signal quality measurement report, said biasing reflecting the RAT preferences.

2. The method of claim 1, wherein indicating the RAT preferences comprises indicating at least one of: a preferred RAT indication to bias the RAT selection decision towards a preferred RAT, a non-preferred RAT indication to bias the RAT selection decision away from a non-preferred RAT, and an infeasible RAT indication to prevent selection of an infeasible RAT.

3. The method of claim 1, wherein indicating the RAT preferences comprises explicitly indicating the RAT preferences to the wireless communication network.

4. The method of claim 1, wherein indicating the RAT preferences comprises implicitly indicating the RAT preferences to the wireless communication network.

5. The method of claim 1, wherein indicating the RAT preferences comprises indicating a degree of preference or non-preference for one or more of the two or more RATs.

6. The method of claim 1, wherein indicating the RAT preferences comprises sending one or more flags, each flag corresponding to one of the two or more RATs, and each flag signifying that the corresponding RAT is one of: preferred, non-preferred, and infeasible.

7. The method of claim 1, wherein the one or more operational attributes correspond to relative costs or benefits for the wireless communication device when operating according to respective ones of the two or more RATs.

8. The method of claim 1, wherein the one or more operational attributes comprise a power consumption of the wireless communication device when operating according to respective ones of the two or more RATs.

9. The method of claim 1, wherein the one or more operational attributes comprise at least one of:

a level of activity or computational complexity required of the wireless communication device when operating according to respective ones of the two or more RATs, radio configurations or capabilities of the wireless communication device when operating according to respective ones of the two or more RATs, quality-of-service requirements associated with any ongoing or planned communications by the wireless communication device, and a state of charge of a battery used to power the wireless communication device.

10. A method of operation by a network node in a wireless communication network, the method comprising:

receiving an indication of Radio Access Technology (RAT) preferences of a wireless communication device, the RAT preferences relating to two or more RATs that are associated with the wireless communication network and are candidates for use in serving the wireless communication device; and making a RAT selection decision for the wireless communication device, wherein the RAT selection decision comprises selecting one of the two or more RATs for use by the wireless communication device, based at least in part on the RAT preferences, wherein selecting one of the two or more RATs for use by the wireless communication device, based at least in part on the RAT preferences, comprises:

receiving a measurement report from the wireless communication device that indicates measured signal levels or qualities for respective ones of the two or more RATs;

obtaining adjusted signal levels or qualities by adjusting one or more of the measured signal levels or qualities, according to the RAT preferences; and making the RAT selection decision based on the adjusted signal levels or qualities;

wherein the RAT preferences comprise one or more signal level or signal quality offset values, each such offset value being used to adjust a corresponding one of the measured signal levels or qualities.

11. The method of claim 10, wherein receiving the indication of the RAT preferences comprises receiving one or more explicit indicators and determining the RAT preferences from the one or more explicit indicators.

12. The method of claim 10, wherein the indication of the RAT preferences indicates a degree of preference or non-preference for one or more of the two or more RATs, and wherein the method includes controlling an extent to which the RAT preferences influence the RAT selection decision in dependence on the indicated degree of preference or non-preference.

13. The method of claim 10, wherein receiving the indication of RAT preferences comprises receiving at least one of the following indications for at least one of the two or more RATs: an indication of preference, an indication of non-preference, and an indication of infeasibility.

14. The method of claim 13, further comprising excluding from consideration in the RAT selection decision any RAT for which an indication of infeasibility is received.

15. The method of claim 10, wherein selecting one of the two or more RATs for use by the wireless communication device, based at least in part on the RAT preferences, comprises making an initial RAT selection and conditionally adjusting the initial RAT selection in dependence on the RAT preferences.

16. The method of claim 10, wherein selecting one of the two or more RATs for use by the wireless communication device, based at least in part on the RAT preferences, comprises adjusting one or more values used to make the RAT selection decision, as a function of the RAT preferences, and evaluating the one or more values after the adjusting.

17. The method of claim 10, wherein receiving the indication of the RAT preferences comprises receiving the indication of the RAT preferences in a measurement report sent by the wireless communication device for the two or more RATs.

18. The method of claim 10, wherein selecting one of the two or more RATs for use by the wireless communication device, based at least in part on the RAT preferences, comprises performing a biased evaluation by biasing, based on the RAT preferences, an evaluation of relative costs or benefits for the wireless communication network regarding use by the wireless communication device of respective ones of the two or more RATs, and making the RAT selection decision in dependence on the biased evaluation.

19. The method of claim 10, wherein selecting one of the two or more RATs for use by the wireless communication device, based at least in part on the RAT preferences, comprises performing an unbiased evaluation of relative costs or benefits for the wireless communication network regarding use by the wireless communication device of respective ones of the two or more RATs, making an initial RAT selection decision in dependence on the unbiased evaluation, and conditionally modifying the initial RAT selection decision as a function of the RAT preferences.

20. A wireless communication device comprising:
communication circuitry configured for communicating with a wireless communication network; and
processing circuitry operatively associated with the communication circuitry and configured to:
perform signal quality measurements for two or more Radio Access Technologies, RATs that are associated with the wireless communication network and are candidates for use in serving the wireless communication device;
determine RAT preferences with respect to the two or more RATs, based on evaluating the signal quality measurements and further based on evaluating one or more operational attributes associated with operating the wireless communication device according to respective ones of the two or more RATs; and
indicate the RAT preferences to the wireless communication network, to influence a RAT selection decision made by the wireless communication network for the wireless communication device,
wherein the processing circuitry is configured to indicate the RAT preferences by explicitly or implicitly indicating the RAT preferences in a signal quality measurement report sent by the wireless communication device to the wireless communication network for the two or more RATs, wherein explicitly indicating the RAT preferences comprises including one or more explicit indicators in the signal quality measurement report and wherein implicitly indicating the RAT preferences comprises biasing one or more signal quality measurements indicated in the signal quality measurement report, said biasing reflecting the RAT preferences.

21. The wireless communication device of claim 20, wherein the processing circuitry is configured to indicate the RAT preferences by indicating at least one of: a preferred RAT indication to bias the RAT selection decision towards a preferred RAT, a non-preferred RAT indication to bias the RAT selection decision away from a non-preferred RAT, and an infeasible RAT indication to prevent selection of an infeasible RAT.

22. The wireless communication device of claim 20, wherein the processing circuitry is configured to indicate the RAT preferences by implicitly indicating the RAT preferences to the wireless communication network.

23. The wireless communication device of claim 20, wherein the processing circuitry indicates the RAT preferences by indicating a degree of preference or non-preference for one or more of the two or more RATs.

24. The wireless communication device of claim 20, wherein the processing circuitry indicates the RAT preferences by sending one or more flags, each flag corresponding to one of the two or more RATs, and each flag signifying that the corresponding RAT is one of: preferred, non-preferred, and infeasible.

25. The wireless communication device of claim 20, wherein the one or more operational attributes correspond to relative costs or benefits for the wireless communication device when operating according to respective ones of the two or more RATs.

26. The wireless communication device of claim 20, wherein the one or more operational attributes comprise a power consumption of the wireless communication device when operating according to respective ones of the two or more RATs.

27. The wireless communication device of claim 20, wherein the one or more operational attributes comprise at least one of:
- a level of activity or computational complexity required of the wireless communication device when operating according to respective ones of the two or more RATs,
- radio configurations or capabilities of the wireless communication device when operating according to respective ones of the two or more RATs,
- quality-of-service requirements associated with any ongoing or planned communications by the wireless communication device, and
- a state of charge of a battery used to power the wireless communication device.

28. A network node comprising:
communication circuitry; and
processing circuitry operatively associated with the communication circuitry and configured to:
- receive, via the communication circuitry, an indication of Radio Access Technology (RAT) preferences of a wireless communication device, the RAT preferences relating to two or more RATs that are associated with the wireless communication network and are candidates for use in serving the wireless communication device; and
- make a RAT selection decision for the wireless communication device, wherein the RAT selection decision comprises selecting one of the two or more RATs for use by the wireless communication device, based at least in part on the RAT preferences, wherein, to select one of the two or more RATs for use by the wireless communication device, the processing circuitry is configured to:
- receive a measurement report from the wireless communication device that indicates measured signal levels or qualities for respective ones of the two or more RATs;
  - obtain adjusted signal levels or qualities by adjusting one or more of the measured signal levels or qualities, according to the RAT preferences; and
  - make the RAT selection decision based on the adjusted signal levels or qualities;
  - wherein the RAT preferences comprise one or more signal level or signal quality offset values, each such offset value being used to adjust a corresponding one of the measured signal levels or qualities.

29. The network node of claim 28, wherein the indication of the RAT preferences indicates a degree of preference or non-preference for one or more of the two or more RATs, and wherein the processing circuitry is configured to control an extent to which the RAT preferences influence the RAT selection decision in dependence on the indicated degree of preference or non-preference.

30. The network node of claim 28, wherein the processing circuitry is configured to receive the indication of RAT preferences by receiving at least one of the following indications for at least one of the two or more RATs: an indication of preference, an indication of non-preference, and an indication of infeasibility.

31. The network node of claim 30, wherein the processing circuitry is configured to exclude from consideration in the RAT selection decision any RAT for which an indication of infeasibility is received.

32. The network node of claim 28, wherein, to select one of the two or more RATs for use by the wireless communication device, the processing circuitry is configured to make an initial RAT selection and conditionally adjust the initial RAT selection in dependence on the RAT preferences.

33. The network node of claim 28, wherein, to select one of the two or more RATs for use by the wireless communication device, the processing circuitry is configured to adjust one or more values used to make the RAT selection decision, as a function of the RAT preferences, and evaluate the one or more values after the adjustment.

34. The network node of claim 28, wherein the processing circuitry is configured to receive the indication of the RAT preferences in a measurement report sent by the wireless communication device for the two or more RATs.

35. The network node of claim 28, wherein, to select one of the two or more RATs for use by the wireless communication device, the processing circuitry is configured to perform a biased evaluation by biasing, based on the RAT preferences, an evaluation of relative costs or benefits for the wireless communication network regarding use by the wireless communication device of respective ones of the two or more RATs, and make the RAT selection decision in dependence on the biased evaluation.

36. The network node of claim 28, wherein, to select one of the two or more RATs for use by the wireless communication device, the processing circuitry is configured to perform an unbiased evaluation of relative costs or benefits for the wireless communication network regarding use by the wireless communication device of respective ones of the two or more RATs, make an initial RAT selection decision in dependence on the unbiased evaluation, and conditionally modify the initial RAT selection decision as a function of the RAT preferences.

* * * * *